United States Patent Office.

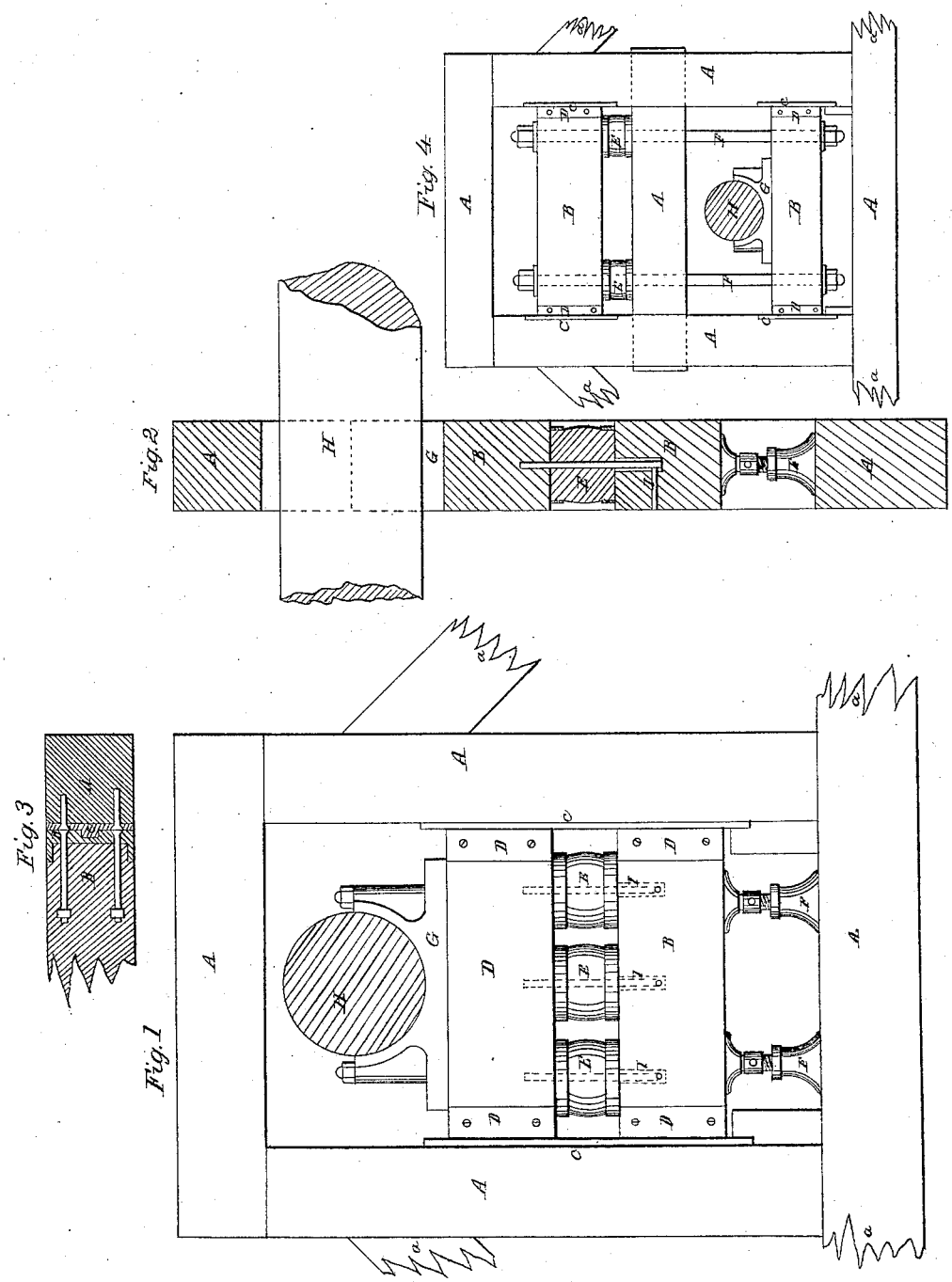

GEORGE K. GLUYAS, OF SAN FRANCISCO, CALIFORNIA.

Letters Patent No. 61,005, dated January 8, 1867.

IMPROVED BEARING FOR SHAFTS OF STEAMSHIPS.

The Schedule referred to in these Letters Patent and making part of the same.

TO ALL WHOM IT MAY CONCERN:

Be it known that I, GEORGE K. GLUYAS, of San Francisco, county of San Francisco, in the State of California, have invented a new and improved centre or spring bearing, called an "Adjustable Spring Bearing" for Steamship or Steamboat Shafts; and I do hereby declare that the following is a full, clear, and exact description of the construction and operation of the same, reference being had to the annexed drawings, making a part of this specification, in which—

Figure 1 is a front elevation.

Figure 2 is a longitudinal elevation.

Figure 3 is a transverse section.

Figure 4, front elevation with the rubbers and screws above the shaft, where the space below the shaft does not admit of using the arrangement, as in fig. No. 1.

A is the frame, and may be made of either wood or iron; B, adjustable blocks; C, slides; D, end blocks for slides; E, elastic or rubber springs, with wrought-iron bands on their ends; F, screws to adjust the proper pressure on the shaft; G, centre bearing pillow block; H, section of shaft; I, air-holes to the rubber springs, a showing the frame and braces.

To enable others skilled in the art to make and use my invention, I will proceed to describe its construction and operation, with the advantages to be derived by its use.

As regards the construction, the drawings are marked and lettered so that any mechanic can construct the machine by reference to the same, and for its operation and advantages I would say that this spring bearing is both adjustable and elastic, and is intended more particularly for a middle support for shafts of side-wheel steamships and steamboats, and is set on the side of the steamship or steamboat, on the "covering piece," over the frame of the hull, inside of the casing that separates the paddle-box room from the inside of the vessel, and about the middle of the length of the shaft, and where the present so-called spring bearings are located. This spring bearing is arranged to be supported by the rubber springs and screws, being either over or under the shaft, as the construction of vessels and space around the shafts may admit of.

The objects obtained by this invention:

1. It enables the engineer to graduate the lifting strain at any moment while the machinery is in motion, as readily as when at "rest."

2. It prevents any undue strain upon the shaft, by the vessel changing her form either by the settling or raising of her guards, or any other portion of the vessel, as, in one case, by suspending the shaft by its end bearings, allowing the shaft to "sag," or by settling of the guards, throwing the weight of shaft, flanges, arms, &c., on the centre bearing, thereby injuring the fibre of the iron in using the machinery while under that undue strain, all of which difficulties are overcome by using this spring bearing, it being at all times adjustable and flexible.

3. By the use of this rubber spring and its accompanying parts, the "tremor" and "jar" that are so unpleasant to travellers, and injurious to both machinery and the hull, are fully overcome; the rubber springs yielding to the irregularities of the motion of the machinery, and the concussion of the paddles on the water, thereby neutralizing all this unpleasant feeling, and causing the shaft to work smoothly, and with less friction than the ordinary bearing now in use.

I do not claim independently the use of the rubber or elastic material, or of the jack or other screws.

What I claim as my invention, and desire to secure by Letters Patent, is—

The arrangement of the frame A, enclosing the adjustable blocks B, guided by the slides C, and the blocks D, and combined with the rubber springs E, and adjustable screws F, substantially as set forth for the purpose specified.

GEO. K. GLUYAS.

Witnesses:
NEIL BARR,
JOHN RODGERS